US009152726B2

(12) United States Patent
Lymperopoulos et al.

(10) Patent No.: US 9,152,726 B2
(45) Date of Patent: Oct. 6, 2015

(54) REAL-TIME PERSONALIZED RECOMMENDATION OF LOCATION-RELATED ENTITIES

(75) Inventors: Dimitrios Lymperopoulos, Bellevue, WA (US); Jie Liu, Medina, WA (US); Melissa Wood Dunn, Woodinville, WA (US); Ashwini K. Varma, Renton, WA (US); Fang Wang, Redmond, WA (US); Jen-Hsien Kenny Chien, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 12/958,320

(22) Filed: Dec. 1, 2010

(65) Prior Publication Data

US 2012/0143859 A1    Jun. 7, 2012

(51) Int. Cl.
*G06F 9/44* (2006.01)
*G06F 17/30* (2006.01)

(52) U.S. Cl.
CPC ............................... *G06F 17/3087* (2013.01)

(58) Field of Classification Search
CPC .................................................. G06F 17/3087
See application file for complete search history.

(56) References Cited

U.S. PATENT DOCUMENTS

| | | | |
|---|---|---|---|
| 7,031,961 B2 | 4/2006 | Pitkow et al. | |
| 7,089,237 B2 | 8/2006 | Turnbull et al. | |
| 8,244,585 B1* | 8/2012 | Huang et al. | 705/14.41 |
| 8,538,973 B1* | 9/2013 | Gonzalez et al. | 707/758 |
| 2003/0200192 A1* | 10/2003 | Bell et al. | 707/1 |
| 2004/0024752 A1 | 2/2004 | Manber et al. | |
| 2004/0260680 A1* | 12/2004 | Best et al. | 707/3 |
| 2005/0065916 A1 | 3/2005 | Ge et al. | |
| 2005/0108213 A1 | 5/2005 | Riise et al. | |
| 2005/0149399 A1* | 7/2005 | Fukunaga et al. | 705/14 |
| 2006/0129533 A1 | 6/2006 | Purvis | |
| 2007/0061363 A1* | 3/2007 | Ramer et al. | 707/104.1 |
| 2007/0198495 A1 | 8/2007 | Buron et al. | |

(Continued)

FOREIGN PATENT DOCUMENTS

| | | |
|---|---|---|
| CN | 101025737 A | 8/2007 |
| CN | 101627384 A | 1/2010 |

OTHER PUBLICATIONS

Lane, et al., "Hapori: Context-Based Local Search for Mobile Phones using Community Behavioral Modeling and Similarity", Retrieved at << http://www.cs.dartmouth.edu/~campbell/hapori.pdf >>, Proceedings of the 12th ACM international conference on Ubiquitous computing, Sep. 26-29, 2010, pp. 10.

(Continued)

*Primary Examiner* — Tarek Chbouki
(74) *Attorney, Agent, or Firm* — Steve Wight; Judy Yee; Micky Minhas

(57) ABSTRACT

A location-related entity ranking technique is described that allows a user see the ranking of location-related entities near a desired location in response to a query. The technique can leverage the searches performed by a community of mobile device users at a given location and at a given time to infer the location-related entities that are popular at this specific location and time window. The technique can also filter out or re-rank these location-related entities based on the personal preferences of the person that submits the query and group preferences of a group to which the user belongs. The personal preferences can also be context specific (i.e. different restaurant preferences for lunch and dinner times).

20 Claims, 5 Drawing Sheets

(56) References Cited

U.S. PATENT DOCUMENTS

| | | | |
|---|---|---|---|
| 2008/0097987 A1 | 4/2008 | Shih et al. | |
| 2008/0222119 A1 | 9/2008 | Dai et al. | |
| 2008/0256444 A1* | 10/2008 | Wang et al. | 715/700 |
| 2008/0306908 A1 | 12/2008 | Agrawal et al. | |
| 2009/0043738 A1* | 2/2009 | James et al. | 707/3 |
| 2009/0164439 A1* | 6/2009 | Nevins | 707/3 |
| 2009/0292692 A1* | 11/2009 | Kaihotsu | 707/5 |
| 2010/0057772 A1* | 3/2010 | Manolescu et al. | 707/103 R |
| 2010/0174703 A1* | 7/2010 | Dandekar et al. | 707/722 |
| 2011/0082880 A1* | 4/2011 | Adimatyam et al. | 707/770 |
| 2012/0136855 A1* | 5/2012 | Ni et al. | 707/724 |
| 2013/0046609 A1* | 2/2013 | Grigg et al. | 705/14.34 |

OTHER PUBLICATIONS

Teevan, et al., "Personalizing Search via Automated Analysis of Interests and Activities", Retrieved at << http://mentor.coventry.ac.uk/MentorMaterials/Personalizing%20Search%20via%20Automated%20Analysis%20of%20Interests%20and%20Activities.pdf >>, The 28th ACM/SIGIR International Symposium on Information Retrieval, Aug. 15-19, 2005, pp. 8.

Keenoy, et al., "Personalisation of Web Search", Retrieved at << http://www.dcs.bbk.ac.uk/~kevin/docs/Keenoy-Levene-ITWP.pdf >>, Intelligent Techniques for Web Personalization, 2005, pp. 29.

"International Search Report", Mailed Date: May 31, 2012, Application No. PCT/US2011/062872, Filed Date: Dec. 1, 2011, pp. 8.

"Third Office Action and Search Report Issued in Chinese Patent Application No. 201110409922.4", Mailed Date: Apr. 3, 2015, 8 Pages.

"First Office Action and Search Report Received for China Patent Application No. 201110409922.4", Mailed Date : Jan. 6, 2014, 10 Pages.

"Second Office Action and Search Report Received for China Patent Application No. 201110409922.4", Mailed Date : Sep. 22, 2014, 11 Pages.

\* cited by examiner

REAL-TIME PERSONALIZED RECOMMENDATION OF LOCATION-RELATED ENTITIES

BACKGROUND

Currently, when users perform searches for local businesses using a search engine, the ranking of the search results is static. That is, the search results only depend on location, and remain the same independent of the time when a query is submitted, the user who submitted the query, and other contextual information surrounding the search. Such contextual information can include, for example, weather, traffic, the popularity of a business and so forth. For instance, local search results for the query "restaurants" at a given location remain the same independent of when the query is submitted. However, users, especially those who submit queries from mobile devices, usually look for different types of restaurants in the morning, at noon or at night. In addition, depending on the personal preferences of the user different types of restaurants might be preferable at different times of day.

Searches for local businesses and other points of interest, especially those that come from mobile computing devices, such as smart phones, reflect users' interests "right here right now." But, the current techniques for ranking local search results fail to capture these temporal, and contextual dynamics.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The location-related entity ranking technique described herein is a technique to rank location-related entities, such as, for example, local businesses, restaurants, entertainment venues, events, and so forth. To do this, one embodiment of the technique leverages the mobile search logs (logs of searches conducted on mobile computing devices) to rank location-related entities in real-time or near real-time. Whenever a user submits a query, the technique examines the location-related entities in the search results that other nearby users have selected after submitting the same or similar queries. In one embodiment, the technique only includes a portion of the mobile search logs that correspond to a given time window. Additionally, in one embodiment of the location-related entity ranking technique, there are two options for searching for location-related entities in response to a search query: real-time search and near real-time search.

In one real-time search embodiment of the technique, to answer a given query submitted at time T on, for example, a Monday, the technique only uses queries that were submitted between (T–X) and T the exact same day (e.g., that Monday). The parameter X can be determined based on the query volume. The technique can increase X's value (i.e., 1 hour, 2 hours, 3 hours, and so on) to ensure that there are enough queries to perform ranking.

In another near real-time search embodiment, if the real-time search option described above fails (for example, that there is not enough query volume available), then query logs that were recorded in a similar time period (for example, on Mondays) and within the time window (T–X, T) are used to provide the search results.

Independently of how the set of search logs is identified, in one embodiment of the technique, the higher number of selections from the search results a location-related entity gets within the selected set of query logs, the higher its ranking score. As users select (e.g., click on with an input device) different location-related entities at different times of the day, the ranking of location-related entities, and therefore the search results shown, will be different, reflecting contextual constraints that are hard to collect, such as weather, traffic, and so on. In one embodiment, any ranking algorithm can be used to rank the location-related entities.

The location-related entity ranking technique can leverage the searches performed by a community of computing device users, such as mobile device users, at a given location and at a given time to infer the location-related entities that are popular at this specific location and time window. The technique can then also filter out or re-rank these location-related entities based on the personal preferences of the user that submits the query. The personal preferences can also be context specific (for example, different restaurant preferences for lunch and dinner times).

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
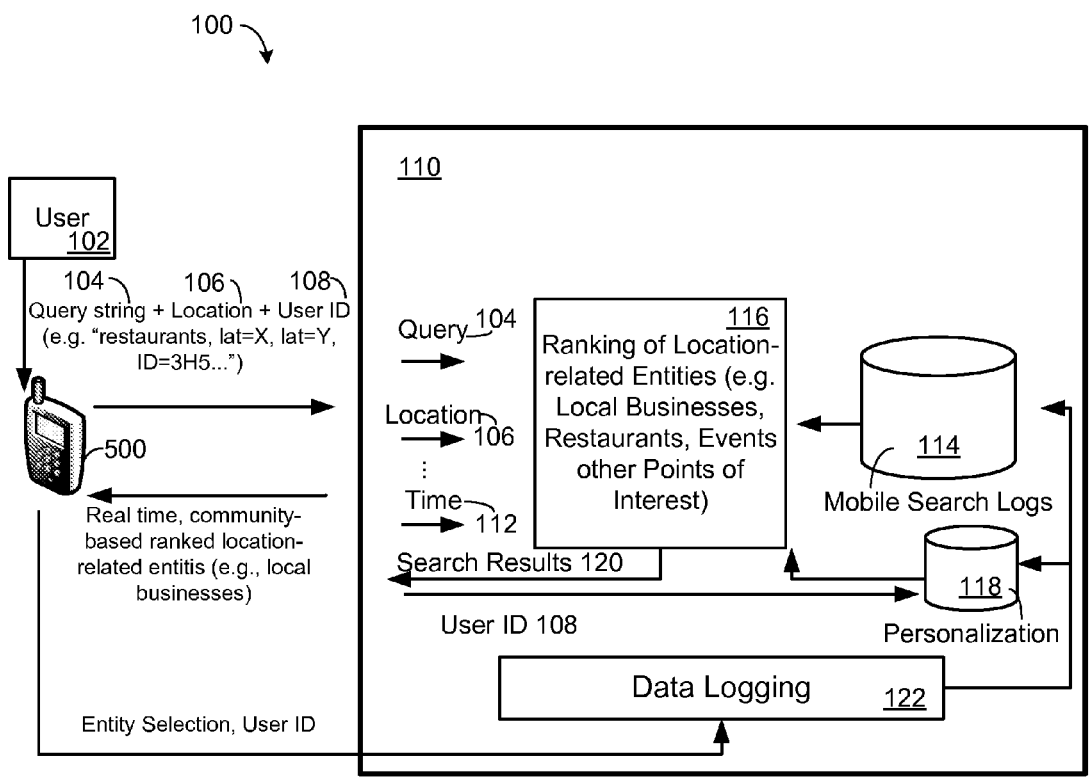
FIG. 1 is an exemplary architecture for employing one exemplary embodiment of the location-related entity ranking technique described herein.

In the following description of the location-related entity ranking technique, reference is made to the accompanying drawings, which form a part thereof, and which show by way of illustration examples by which the location-related entity ranking technique described herein may be practiced. It is to be understood that other embodiments may be utilized and structural changes may be made without departing from the scope of the claimed subject matter.

1.0 Location-Related Entity Ranking Technique

The following sections provide an introduction and an overview of the location-related entity ranking technique, as well as an exemplary architecture and exemplary processes for practicing the technique. An exemplary scenario for applying the technique is also provided.

1.1 Introduction

Contextual information is important for ranking location-related entity search results, such as, for example, search results for queries for local businesses, restaurants, events, museums, parks and other such points of interest. However, obtaining, annotating, and classifying such information is difficult. Users themselves are a good source for such information. Various embodiments of the location-related entity ranking technique described herein leverage this fact. By looking at what each member of a community of people select after they perform a search within a time window, the technique can acquire a robust, although implicit, estimate of what is a popular choice for that community given the context (e.g. temporal, personal, environmental etc.) during that time window.

1.2 Overview of the Technique

The location-related entity ranking technique described herein ranks location-related entities according to popularity. To do this, in one embodiment, the technique leverages the search logs of mobile devices (for example, logs of searches conducted on mobile devices) to rank location-related entities in real-time (or near real-time). (It should be noted that the search logs for non-mobile computing devices can also be used as long as location information is available). Additionally, the search log data can also be augmented with other data, such as, for example, phone log data or social networking data For example, a phone call to, or a post about, a location-related entity can be used in the same way as in the search logs when determining how often a location-related entity is selected. In addition, in one embodiment, during ranking, higher weight can be given to phone calls or social networking posts, since these actions show explicit user preference versus search log user selections which provide implicit user preference. Whenever a user submits a query, the technique examines the location-related entities in the search results that other nearby users have selected (e.g., clicked on, called or blogged about) after submitting the same or similar queries. Query similarity can be determined, for example, by comparing the similarity of query terms. For instance, the technique can compare the terms entered by a user to other terms entered by other users, where the same entity or class of entities was selected by the user. These terms then are classified and can be used as lexical markers when new terms appear. So over time the technique might relate the terms "noodle" and "spaghetti" as generating a weighted similar result. For example, if the queries "pasta" and "shrimp" both result into clicking Italian restaurants about 90% of the time, then one embodiment of the technique will determine that the two queries are similar in the sense that they refer to the same type of businesses. In one embodiment, the technique only includes the part of the mobile search logs that correspond to a given time window.

In one embodiment of the location-related entity ranking technique, there are two options for selecting a time window for recommending location related entities to a user. The first option involves a real-time search for location-related entities of the type the user might be interested in, in response to the user's query. In one embodiment, the technique determines the type of location-related entity as follows. The technique examines all nearby location-related entities (e.g., businesses) and computes a score for each one. The higher the score, the higher in the search results the location-related entity is shown. This score is computed based on context-constrained logs. For example, given the query "Italian" the logs will have only very few (ft not none) clicks on Japanese restaurants. As a result, Japanese restaurants will get a low score and will not be shown high up in the list of search results. If the technique has to answer a query never seen before, the technique might not show results at all or show results that are not relevant. The second option involves a near real-time search for location-related entities. In this scenario, the technique searches for location-related entities over a similar time period (but not the same time period) as the time the query was entered.

Independent of how the set of search logs is identified, the higher number of selections by users from the search results (e.g., input device clicks) a location-related entity gets within the search results for the selected set of query logs, the higher its ranking score. As users select different location-related entities at different times of the day, the ranking of location-related entities, and therefore the search results shown, will be different, reflecting contextual constraints that are hard to collect, such as weather, traffic, and so forth. Note, that any ranking algorithm can be used to rank location-related entities. It should be noted that the way the technique selects the set of input data (search logs) to be input to the ranking algorithm (e.g., the real-time option or near real-time option) is an important consideration in the application of the technique.

In one embodiment, the technique discovers time-dependent personal preferences of a specific user that submits the query and uses these time-dependent preferences to filter or rank the location-related entities discovered through the mobile search logs. The determination of these time-dependent personal preferences can be performed by monitoring the types of location-related entities that the user selects after each query. In that way the technique can learn over time the type of location-related entity that this user is interested in. In one embodiment, the technique generates preferences for a user based on different time windows within a day or even across days or seasons (i.e., summer versus winter). For instance, if it is known that a user likes Italian restaurants for lunch, then when that user searches for "restaurants" during lunch time, the technique is able to display and rank higher the nearby Italian restaurants. If the user prefers diners for dinner then the exact same query from that user during dinner time should include more diner location-related entities.

In one embodiment the technique also leverages the personalized selection of the search results by users to group users into communities or groups, defined implicitly by their background, preferences, and demographic characteristics. As a result, one embodiment of the technique can refine the previously described search log analysis to target specific communities with different rankings. For example, if people who select Italian restaurants for dinner usually choose pizza for lunch, then when a given user sends a restaurant query around noon, the refined search log analysis will indicate that a nearby pizza restaurant has a high rank in the result. Note that since user preferences vary over time, the groups formed also vary over time. For instance, a user might belong to different groups depending on the time when the query is submitted.

In essence, in one embodiment, the technique leverages the searches performed by a community of mobile device users at a given location and at a given time to infer the location-related entities that are popular at this specific location and time window. Then the technique filters out or re-ranks these location-related entities based on the personal preferences of the user that submits the query. The personal preferences can also be context specific (for example, different restaurant preferences for lunch and dinner times).

An overview of the location-related ranking technique having been provided, the following sections provide an exemplary architecture and exemplary processes for practicing the technique.

1.3 Exemplary Architecture

FIG. 1 provides a diagram of an exemplary architecture in which the location-related entity ranking technique can be implemented. As shown in FIG. 1, when a user 102 submits a query 104 using a mobile computing device 500 (which will be discussed in greater detail with respect to FIG. 5), the query string 104 along with the location 106 of the user (or optionally a different relevant location) and a user ID 108 are transmitted to a server 110 (or more than one server that performs the same functions as shown in block 110). The query 104, location 106, as well as the time 112 that the query 104 was submitted are recorded at the server 110.

Based on the location 106, time 112 and the query 104 itself, a fraction of a set of search logs 114 (e.g., mobile search logs) is identified using a real-time or near real-time methodology as discussed below. In one embodiment of the location-related entity ranking technique, there are two options for determining the portion of the search log data to be used in recommending location related entities to a user. The first option involves a real-time search for location-related entities of the type the user might be interested in, in response to the user's query. The second option involves a near real-time search for location-related entities. In this scenario, for example, the technique searches for location related entities over the same time period the query was entered but across multiple days.

For example, in the real-time search option, to answer a given query submitted at time T on, for example, a Monday, the technique, in one embodiment, only uses queries that were submitted between (T−X) and T the exact same day (e.g., that Monday). The parameter X can be determined based on the query volume. The technique can increase X's value (i.e., 1 hour, 2 hours, 3 hours, and so on) to ensure that there are enough queries to perform ranking. In the near real-time search option, if the real-time search option described above fails (for example, not enough query volume is available), then query logs that were recorded only on given days (e.g., Mondays) and within the time window (T−X, T) are used.

The portion of search logs 114 identified is used to rank the location-related entities in a location-related entity ranking module 116 on the server 110. The portion of the search logs 114 used can also be optionally filtered based on group membership of the user prior to the ranking. This will be discussed in greater detail with respect to FIG. 3 and FIG. 4. The group memberships for a given user can vary with different periods of time and location.

Whenever a user submits a query, the technique counts the location-related entities in the search results that other nearby users have selected after submitting the same or similar query. The more often a location-related entity appears in the selected portion of search logs the higher its ranking score. In practice, any ranking algorithm can be applied at this step.

In one embodiment of the technique, based on the user ID, the personal preferences of the user that submitted the query can be stored in a personalization database 118 and can be used to further filter or re-rank the local location-related entities in the location-related entity ranking module 116. In addition, the personal preferences can be conditioned on time information (for example, time, day, season, and so forth). For instance the preferences of a person might be different when he submits a query on Monday morning.

More specifically, users can provide personal preferences explicitly or implicitly. In the first case, in one embodiment, the user answers questions (for example, right after he installs an application for the technique on his mobile computing device) about his preferences. These personal preferences can vary with time. The information provided by the user might be of the form "I like expensive Italian and French restaurants over the weekend", "During weekdays I am usually interested in fast food places", "I prefer places with outdoor seating", and so forth. Alternately, the determination of user preferences can be implicit. For example, if a user selects expensive Italian and French restaurants 90% of the time after he submits the query "restaurants", then the technique can assume that this user likes expensive Italian and French restaurants.

Many categories of location-related entities can be established. For example, these could include business attributes (e.g., atmosphere, dress code, and so forth), locations where the user usually goes to visit businesses of a given type and time windows during which the user usually searches for or visits businesses). After user preferences are constructed, group preferences can be created by clustering the user preferences together based on how similar the individual preferences are.

It should be noted that while the real-time ranking of location-related entities described herein is being described as being performed on a server 110, this ranking could also alternatively be performed on the mobile computing device 500 with a similar ranking module installed on it. In another embodiment the functions described herein with respect to the server could be performed in a computing cloud.

The ranked search results 120 returned in response to the query 104 are transmitted back to the user 102. After the user 102 selects a location-related entity from the returned search results 120, this data is logged in a data-logging module 124 on the server 110 and a new entry in the mobile search logs 114 is created and the personal preferences of that user are properly updated in the personalization database 118. The data logging module is responsible for recording user activities (e.g., user selections or clicks in this case) in response to queries. In one embodiment, to make sure that this information is up to date, the datalogger records every user selection (e.g., click). For example, the datalogger can record query, user ID, device type, time of day, day of the week, and so forth. This information is leveraged to perform the ranking of the location-related entities.

The real-time ranking module 116 periodically re-ranks local location-related entities for each community, time-window and other context parameter values to reflect user preferences in real-time. For example, in one embodiment, as described above, every time a user clicks on (selects) a search result, the search logs are updated. Since this is after real-time ranking, the technique seeks to capture these changes in the user selection (e.g., click) behavior over time. To do so, the technique computes the ranking of local location-related entities (e.g., businesses) periodically for every combination of context parameters considered (e.g. time window, day of week etc.). By periodically doing this, the technique enables real-time ranking and allows the server to reply to queries quickly (since the ranking is already computed).

An exemplary architecture for practicing the technique having been discussed, the following section describes some exemplary processes for practicing the technique.

Figure 2:
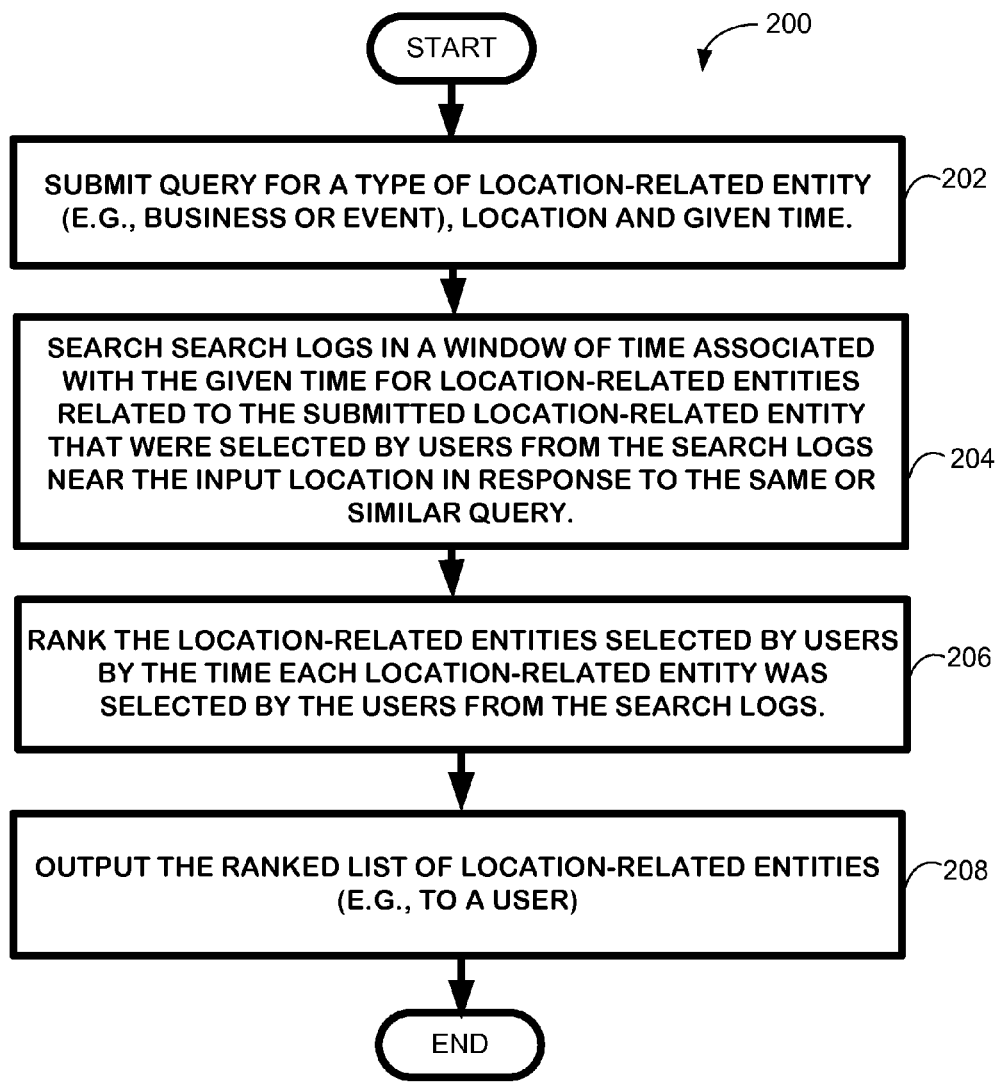
FIG. 2 depicts a flow diagram of an exemplary process for employing one embodiment of the location-related entity ranking technique.

1.4 Exemplary Processes for Employing the Location-Related Entity Ranking Technique A flow diagram of one exemplary embodiment 200 for carrying out the location-related entity ranking technique is shown in FIG. 2. As shown in FIG. 2, block 202, a query for a type of location-related entity (e.g., business, venue, point of interest) and a location and a given time (for example, the current time) is input into a search engine. Search logs in a window of time associated with the input time are then searched for location-related entities of the type of location-related entity input that were selected by users from the search logs near the input location in response to the same or similar query, as shown in block 204. The location-related entities selected by users are then ranked by the number of times each location-related entity was selected by users from the search logs, as shown in block 206. The ranked list of the location-related entities is then output, as shown in block 208.

Figure 3:
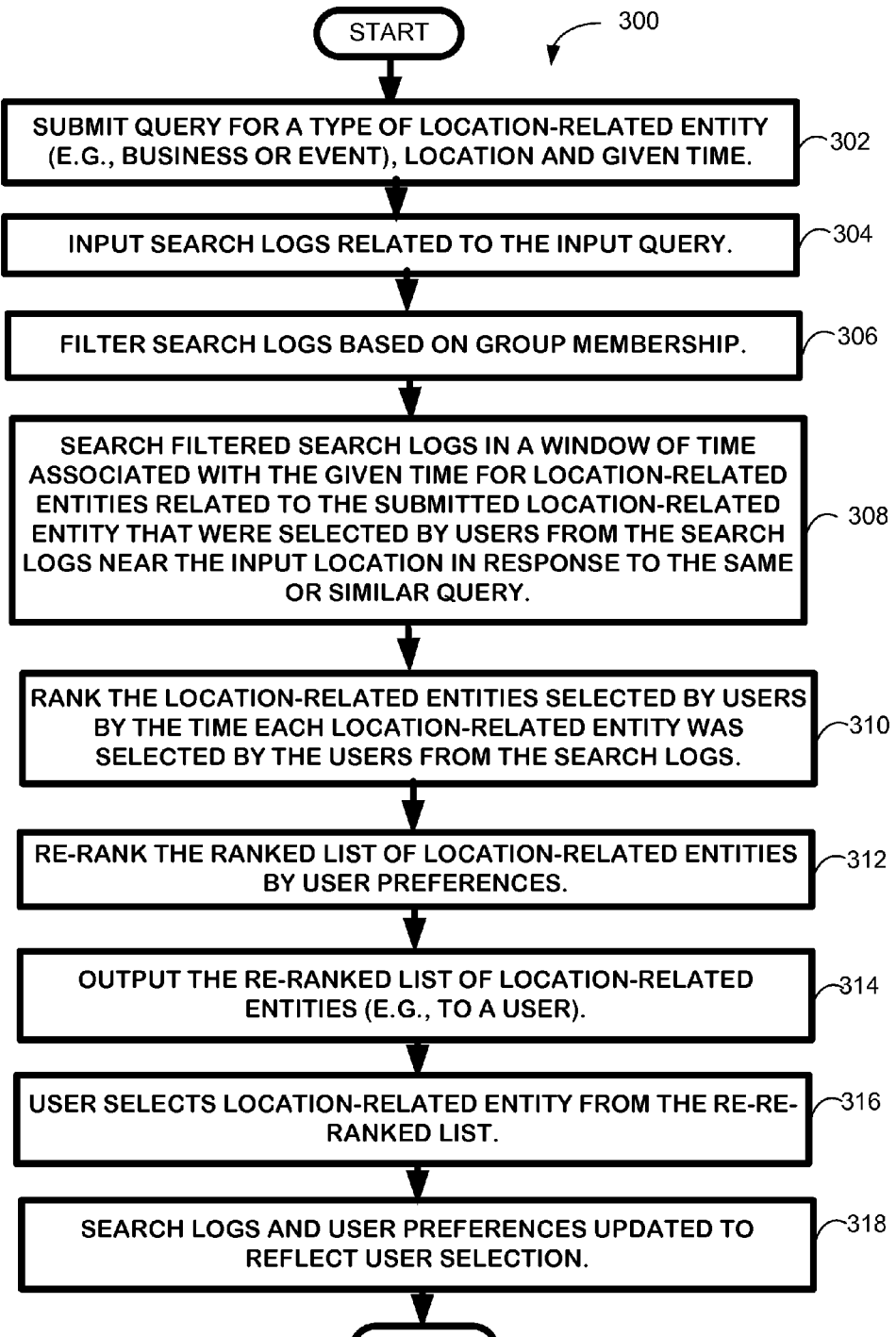
FIG. 3 depicts a flow diagram of another exemplary process for employing another embodiment of the location-related entity ranking technique.

A flow diagram of another exemplary embodiment 300 for carrying out the location-related entity ranking technique is shown in FIG. 3. As shown in FIG. 3, block 302, a query for a type of location-related entity is input at a given time and location into a search engine. Search logs from several users associated with the input query are also input, as shown in block 304. These search logs are optionally also filtered to contain only a window of time around the input given time (or optionally can be filtered to pertain to a window of time similar to the input time). The search logs associated with the search query can also be filtered based on group membership preferences (block 306), as previously discussed with respect to FIG. 2.

These filtered search logs, in a window of time associated with the input time, are searched for location-related entities of the type of location-related entity input that were selected by users from the filtered search logs near the input location in response to the same or similar query (block 308). The location-related entities selected by users are ranked by the number of times each location-related entity was selected by users from the filtered search logs, as shown in block 310.

The ranked list of location-related entities is then re-ranked based on the user preferences of the user that input the query, as shown in block 312, and output to the user, as shown 314. Then, to update the search logs and preferences, as shown in block 316, the user that input the query selects a location-related entity from the ranked list of location-related entities, and the search logs and user preferences are updated to show the user selected the selected location-related entity in response to the query (as shown in block 318).

1.5 Exemplary Scenario for Using the Location-Related Entity Ranking Technique

Figure 4:
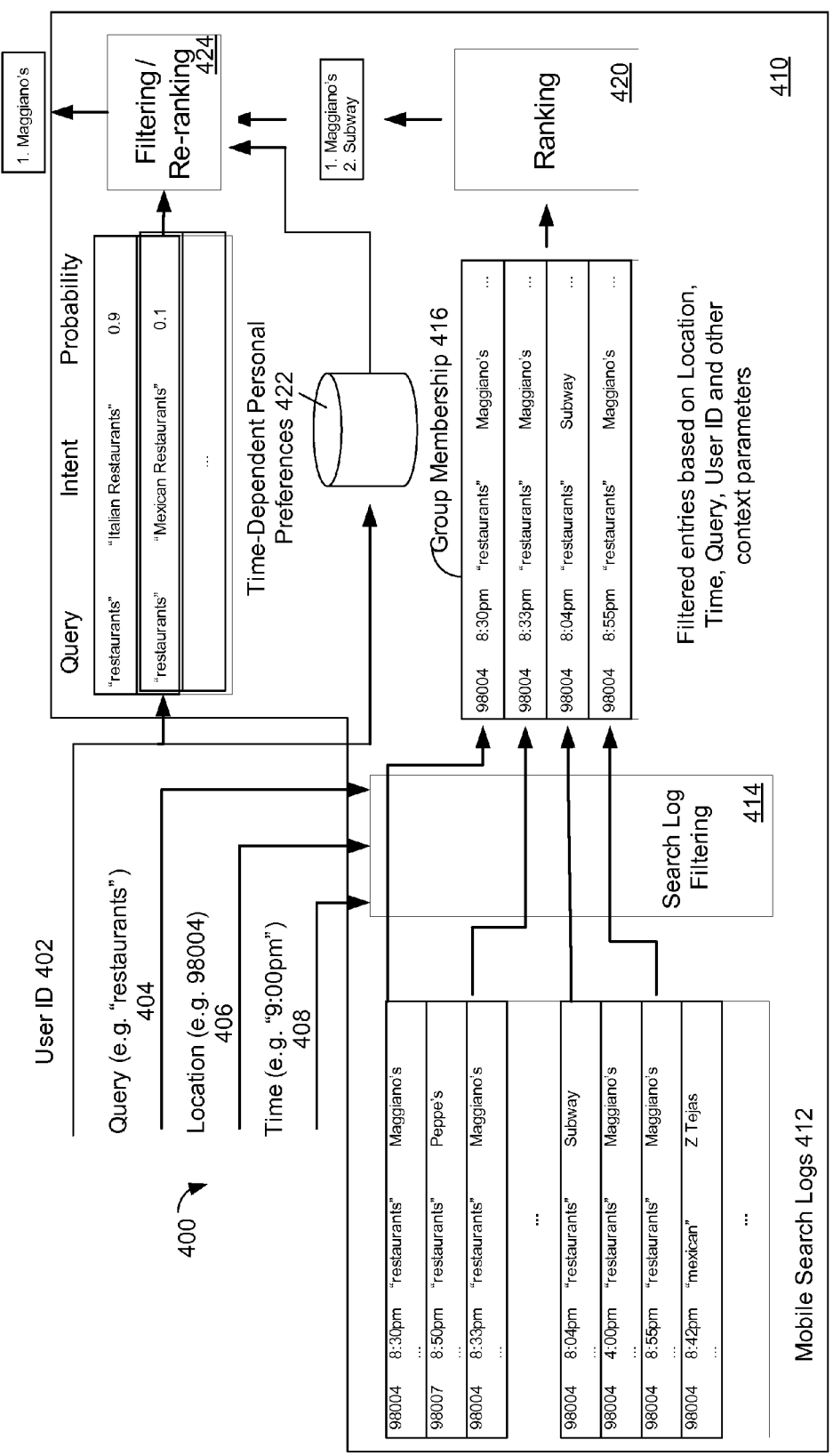
FIG. 4 depicts a schematic of an exemplary scenario for using the location-related entity ranking technique described herein.

In FIG. 4 an exemplary scenario 400 is presented to demonstrate how the ranking of location-related entities takes place in one embodiment of the location-related entity ranking technique. To simplify the scenario, it is assumed that a zip code is the lowest possible location resolution and that one is interested in ranking location-related entities within a time window of 1 hour. In practice, any location measurement and resolution available and any time window can be used.

As shown in FIG. 4, a user (identified by user ID 402) submits the query 404 "restaurants" at the location 406 identified with zip code "98004" at time 408 "9:00 pm local time". When this information 404, 406, 408 reaches the server 410, the server will use real-time search indexes that reflect all of the entries in the mobile search logs 412 that correspond to zip code "98004" that were recorded in the past hour (8-9 pm) and the associated query string was "restaurants". If the user has a known profile, e.g. she falls into the "people who likes high-end restaurant" category, then the server uses the search index built for that particular group of users 416 using a filtering module 414. Given the identified portion of mobile search log entries 418, a ranking procedure is applied in a ranking module 420 to rank the location-related entities that were selected by other similar users. In this example, "Maggiano's" gets a score equal to 3 because it appears in 3 entries, and "Subway" gets the score 1 because it appears in only one entry. The overall number of search log entries used to perform the location-related entity ranking can be used to estimate the confidence of the ranking results (the higher the number of entries used the more robust the ranking results will be). The ranked location-related entities are further filtered in a filtering/re-ranking module 424 using the time-dependent personal preferences (block 422) of the user that submitted the query. In this scenario, the user seems to be only interested in Italian and Mexican restaurants after submitting the query "restaurants" (block 426). As a result, "Subway" is removed from the search results 428 as an irrelevant business for the specific user (or alternatively it could be ranked lower for that user). Note that multiple personal preferences tables might exist for a given user for different time windows or days.

2.0 The Computing Environment

The location-related entity ranking technique is designed to operate in a computing environment. The following description is intended to provide a brief, general description of a suitable computing environment in which the location-related entity ranking technique can be implemented. The technique is operational with numerous general purpose or special purpose computing system environments or configurations. Examples of well-known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 5:
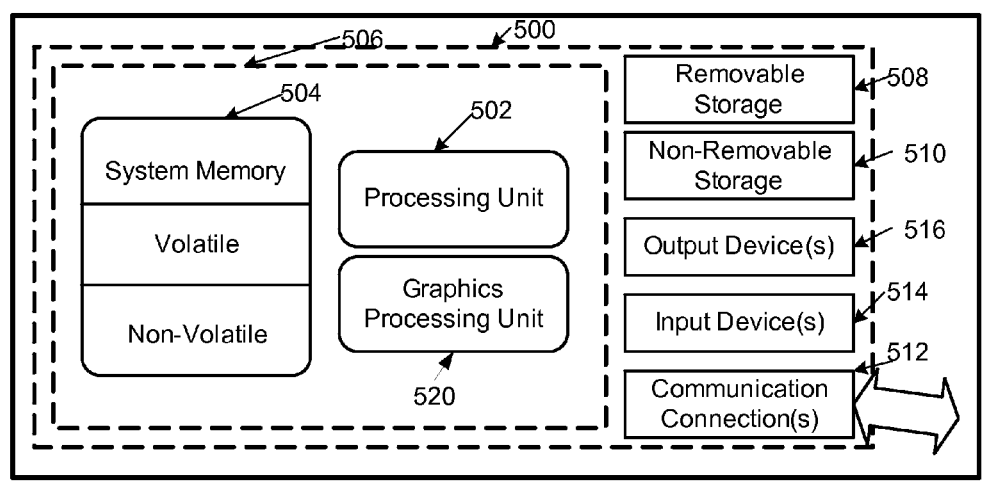
FIG. 5 is a schematic of an exemplary computing device which can be used to practice the location-related entity ranking technique.

FIG. 5 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 5, an exemplary system for implementing the location-related entity ranking technique includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Computer readable media include both transitory, propagating signals and computer (readable) storage media. Any such computer storage media may be part of device 500.

Device 500 also can contain communications connection(s) 512 that allow the device to communicate with other devices and networks. Communications connection(s)

512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 500 may have various input device(s) 514 such as a display, keyboard, mouse, pen, camera, touch input device, and so on. Output device(s) 516 devices such as a display, speakers, a printer, and so on may also be included. All of these devices are well known in the art and need not be discussed at length here.

The location-related entity ranking technique may be described in the general context of computer-executable instructions, such as program modules, being executed by a computing device. Generally, program modules include routines, programs, objects, components, data structures, and so on, that perform particular tasks or implement particular abstract data types. The location-related entity ranking technique may be practiced in distributed computing environments where tasks are performed by remote processing devices that are linked through a communications network. In a distributed computing environment, program modules may be located in both local and remote computer storage media including memory storage devices. Still further, the aforementioned instructions could be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for ranking location-related entities within a certain geographic area in response to a search query, comprising:
    receiving a query for a geographic location-related entity of a given type, a location within a certain geographic area and a current time;
    using the received query, searching mobile search logs of a mobile computing device in a real-time window of time incorporating the current time for geographic location-related entities within the certain geographic area of the given type received that were selected by users near the received location in response to a same or similar query as the received query;
    ranking the geographic location-related entities within the certain geographic area selected by users from the mobile search logs by the number of times each geographic location-related entity was selected by users from the mobile search logs in response to the same or similar query as the received query in the real-time window of time incorporating the current time; and
    outputting the ranked list of the geographic location-related entities most frequently selected by users within the certain geographic area in the real-time window of time incorporating the current time to a user.

2. The computer-implemented process of claim 1, further comprising re-ranking the ranked list of location-related entities based on time-dependent user preferences of a user that input the query before outputting the ranked list of location-related entities.

3. The computer-implemented process of claim 2, wherein the user preferences vary based on the user's location.

4. The computer-implemented process of claim 1, further comprising determining time-dependent group memberships by grouping users by time, location, query and query results.

5. The computer-implemented process of claim 4, further comprising filtering the mobile search logs based on time-dependent group membership preferences before searching the mobile search logs.

6. The computer-implemented process of claim 5, wherein the groups a user belongs to can change over different periods of time and location.

7. The computer-implemented process of claim 1, wherein the time window is selected based on the time the query was entered.

8. The computer-implemented process of claim 7, wherein if there is not sufficient mobile search log data to create a ranked list for the window of time, the time window associated with the current time is selected to be in the same period as the input time on a previous day.

9. The computer-implemented process of claim 1, wherein the ranking of the geographic location-related entities occurs in real-time.

10. A computer-implemented process for ranking location-related entities, comprising:
    receiving a query for a location-related entity type at a current time and geographic location within a certain geographic area;
    receiving mobile search logs of a mobile computing device associated with the received query and limited to a window of time, determined based on query volume, proximate to the current time;
    using the received query, searching the mobile search logs in the window of time proximate to the current time for location-related entities within the certain geographic area of the location-related entity type received that were selected by users from the mobile search logs near the input location in response to the same or similar query as the received query in the window of time proximate to the current time;
    ranking the location-related entities within the certain geographic area selected by users by the number of times each location-related entity type was selected by users from the received mobile search logs in the window of time proximate to the current time; and
    outputting a ranked list of the location-related entities most frequently selected by users within the certain geographic area in the window of time proximate to the current time.

11. The computer-implemented process of claim 10, further comprising re-ranking the ranked list of location-related entities based on time-dependent user preferences of a user that input the query.

12. The computer-implemented process of claim 10, further comprising filtering the mobile search logs based on time and location dependent group preferences of a group to which the user that input query belongs prior to searching the mobile search logs.

13. The computer-implemented process of claim 10 further comprising the actions of:
   a user that input the query selecting a location-related entity from the ranked list; and
   updating the mobile search logs to show the user selected the selected location-related entity in response to the query.

14. The computer-implemented process of claim 10, further comprising the actions of:
   a user that input the query selecting a location-related entity from the ranked list of location-related entities; and
   updating the user's time-dependent user preferences to reflect the location-related entity selected by the user.

15. The computer-implemented process of claim 14, wherein the updated time-dependent user preferences further comprise:
   locations the user usually visits;
   types of locations the user visits; and
   a distance the user is willing to go to visit a location.

16. A system for determining popular location-related entities around a given location at a given time, comprising:
   a computing device;
   a computer program comprising program modules executable by the computing device, wherein the computing device is directed by the program modules of the computer program to:
      receive a query to search mobile search logs of a mobile computing device for a type of geographic location-related entity at a given location within a certain geographic area at a current time;
      filter the mobile search logs based on group membership of a user that entered the query;
      search the filtered mobile search logs for the type of geographic location-related entity at the given location selected by users from the filtered mobile search logs near the input location in response to the same or similar query as the received query in a window proximate to the current time;
      rank each geographic location-related entity within the geographic area according to the number of times the geographic location-related entity was selected from the filtered mobile search logs in the window proximate to the current time in response to the same or similar query as the input query;
      output a ranked list of geographic location-related entities most frequently selected by users within the geographic area in a window of time incorporating the current time.

17. The system of claim 16, further comprising a module to re-rank the ranked list by preferences of the user that entered the query that vary with time of day.

18. The system of claim 16, further comprising a module to re-rank the ranked list based on group preferences that vary with the time of day.

19. The system of claim 16, further comprising a module to use additional data sources to augment the mobile search log data comprising phone log data.

20. The system of claim 16, further comprising a module to use additional data sources to augment the mobile search log data comprising social network data.

* * * * *